United States Patent [19]

Rhoads

[11] Patent Number: 4,817,136
[45] Date of Patent: Mar. 28, 1989

[54] TELEPHONE DIALING SYSTEM

[76] Inventor: Richard M. Rhoads, 12228 Venice Blvd., #308, Los Angeles, Calif. 90066

[21] Appl. No.: 86,935

[22] Filed: Aug. 17, 1987

[51] Int. Cl.[4] ............................................. H04M 1/26
[52] U.S. Cl. ...................................... 379/357; 379/91; 379/63
[58] Field of Search ............................ 379/91, 63, 357

[56] References Cited

U.S. PATENT DOCUMENTS

| | | | |
|---|---|---|---|
| 4,126,768 | 11/1978 | Grenzow | 379/357 |
| 4,332,985 | 6/1982 | Samuel | 379/357 |
| 4,521,648 | 6/1985 | Hegi | 379/357 |
| 4,535,204 | 8/1985 | Hughes et al. | 379/357 |
| 4,677,657 | 6/1987 | Nagata et al. | 379/63 |
| 4,734,928 | 3/1988 | Weiner et al. | 379/59 |

OTHER PUBLICATIONS

Weinstein, S. B., "Smart Credit Cards: The Answer to Cashless Shopping", IEEE Spectrum, 2/84, pp. 43-49.

Primary Examiner—Robert Lev
Attorney, Agent, or Firm—Robert J. Schaar

[57] ABSTRACT

A telephone dialing system which utilizes a calling card having party identification information thereon as well as a telephone number digitally encoded thereon. The calling card is capable of being inserted into a dialing unit which will automatically dial the telephone number encoded on the calling card. The dialing unit automatically determines whether or not the area code included within the telephone number is to be dialed or disregarded. In addition, the dialing unit will automatically determine whether or not additional digits are to be generated for dialing of the telephone number on the card.

11 Claims, 2 Drawing Sheets

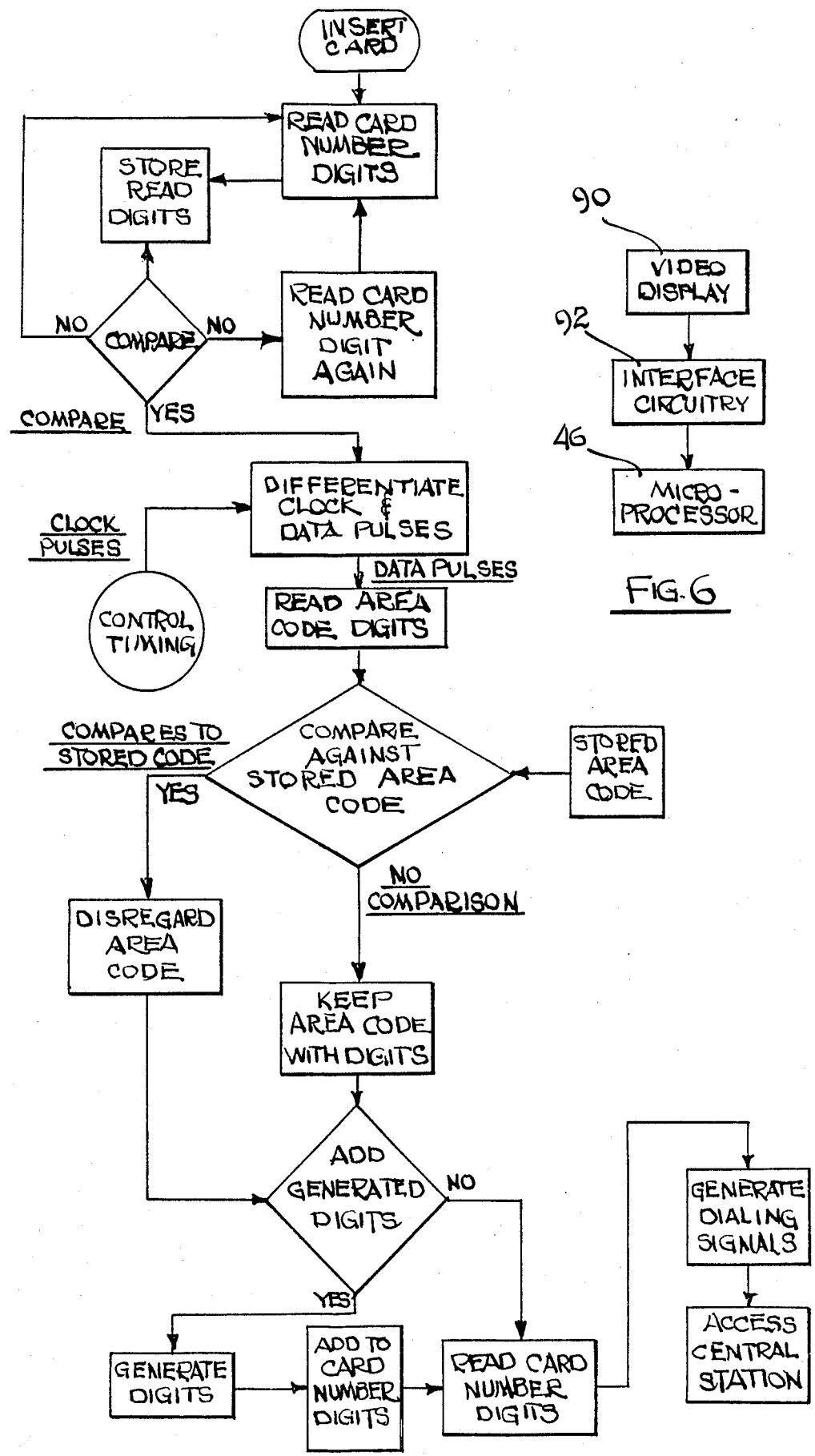

TELEPHONE DIALING SYSTEM

BACKGROUND OF THE INVENTION

1. Field of the Invention

This invention relates in general to certain new and useful improvements in telephone dialing units, and more particularly, to a calling card, or so-called "business card", having party identification information thereon, as well as a telephone number encoded thereon and a dialing unit which is capable of automatically dialing the telephone number on that calling card.

2. Brief Description of the Prior Art

The use of reading units for automatically reading credit card information is well known. Credit card verification units, both off-line and on-line are used in many commercial establishments for determining the validity or the account delinquency of a credit card user. In like manner, cards containing magnetically encoded indicia are used with automatic bank stations and the like for automatically dispensing cash upon the user inserting a card or introducing other keyed input information.

Telephone pay stations which include credit card reading mechanisms are also well known. In these systems, the user of the credit card inserts his or her credit card into a slot of a credit card reader. The reader will automatically read the identification number for that credit card holder for purposes of billing the number which is to be dialed to that particular card user. After the credit card has been read, and authorization given to use the telephone, the user can thereafter dial the telephone number of the party he or she wishes to call.

In these types of telephone credit card systems, after the card has been read, the telephone set initiates a verification signal to the central office indicating that the credit card has been inserted. In response to the signal, the exchange connects the telephone set to the central station which causes the card to be read and the information thereon to be sent to a control unit. Thereafter, upon complete recording of the information in the control unit, an enable signal is sent back to the telephone set.

One such form of telephone credit card system is more fully described in U.S. Pat. No. 4,595,983 dated June 17, 1986 and entitled "Central Office Powered Credit Only Pay Station". Another form of credit card telephone system is described in U.S. Pat. No. 4,326,123 entitled "Telephone Credit Card System". In this latter system, the credit card information on a credit card is read and transmitted to a general purpose computer. The computer is used for interfacing the telephone system with the telephone network. The computer is also used for recording the credit card information and authorizes the actuation of the dialer associated with that telephone set.

U.S. Pat. No. 4,326,123 to Hosterman entitled "Telephone Credit Card System" discloses a telephone credit card unit which operates in conjunction with a dialer for permitting the dialing of frequently used telephone numbers. A computer is utilized for reading credit card information for purposes of billing and a separate dialer is used for manually introducing the telephone number.

Heretofore, there has not been any calling card which contains party identification information and which ca be used to automatically initiate a telephone dialing operation. This would be desirable as a time saving mechanism and to avoid record keeping and, to some extent, maintains privacy of telephone numbers. Heretofore, there also has not been any telephone dialing mechanism which will automatically dial a telephone number upon reading the telephone number encoded onto a card member.

OBJECTS OF THE INVENTION

It is, therefore, one of the primary objects of the present invention to provide a calling card which includes party identification information thereon and a digitally encoded telephone number thereon such that the telephone number is capable of being read and used for generating a dialing signal to automatically dial the number of the party identified on the calling card.

It is another object of the present invention to provide a calling card of the type stated in which the telephone number of that party may also be visibly recorded on the calling card in addition to being digitally encoded thereon.

It is a further object of the present invention to provide a calling card of the type stated in which the telephone number may be encoded thereon in a variety of manners and in which the card member may be made from a variety of materials.

It is also an object of the present invention to provide an apparatus which reads a digitally encoded telephone number on a car member and automatically dials that telephone number from the then read telephone number by accessing the particular telephone set directly to the central station.

It is an additional object of the present invention to provide an apparatus for reading a digitally encoded telephone number of the type stated which is capable of utilizing a microprocessor for reading and initiating the dialing signal therefrom.

It is another salient object of the present invention to provide a system which automatically reads a telephone number of a party on an identification card and which system is capable of determining whether or not the area code of the telephone number on the calling card is to be dialed or disregarded and whether or not additional digits are to be generated along with the telephone number included on the calling card.

It is still a further object of the present invention to provide a system of the type stated which can automatically store information read from a card member into a digital computer and display that information and also to enable the dialing of a telephone number encoded on that card member.

It is still another object of the present invention to provide a method for automatically dialing the telephone number of a party identified on an identification card.

With the above and other objects in view, my invention resides in the novel features of form, construction, arrangement and combination of parts presently described and pointed out in the claims.

BRIEF SUMMARY OF THE INVENTION

In one embodiment, the present invention provides a calling card which comprises a substrate having a person's identification on that substrate. This person identification information may include, for example, the name and address of the party whom the calling card identifies. Other information, such as title, company position, company name, or the like, may be included thereon.

The calling card also includes digitally encoded information, such as a digitally encoded telephone number on that calling card. This telephone number is digitally encoded in such manner that it is capable of being read by a telephone dialing unit as hereinafter described, for generating a dialing signal. This dialing signal is used to automatically dial the telephone number of the party who is identified on the calling card.

The telephone number, which is digitally encoded on the calling card, is essentially only in machine readable form, that is, in a form in which it is capable of easily being read by credit card reading apparatus, although not necessarily determinable by visual examination. However, the telephone number of that party may be included in visual form on the calling card.

The present invention also comprises a system for automatically dialing the telephone number identified on an identification card of this party. This system generally comprises the identification card of the party containing that party identification information thereon a well as a telephone number encoded thereon. A reader is provided for reading the telephone number encoded on the identification card. An area code determination means is associated with the reader for determining if the area code contained in the telephone number on the identification card is to be disregarded or to be included in a dialing operation for the telephone number.

A processor means is provided for determining if the area code is or is not to be included in the dialing information of the telephone number which is to be dialed. This processor means will cause the area code to be included if it is to be properly part of the number to be dialed or disregarded if the number to be dialed does not require area code dialing. Means is also provided for connecting the card reader to a telephone set for dialing the telephone number after determination of whether or not the area code is to be included in the dialed telephone number.

More specifically, the area code determination means comprises a comparator means along with a microprocessor. In addition, a digit generator is also operatively connected to the microprocessor in order to generate one or more additional digits to be included in the telephone number to be dialed.

The means for automatically dialing is connected to the telephone set and to the central station of the telephone company via the telephone line. Thus, when a calling card is inserted into the dialer, a processor unit associated with that dialer will automatically determine whether or not the area code is to be included and then automatically dial the telephone number through the central station.

An apparatus is provided for reading a digitally encoded telephone number on a card member, whether or not that card member is a calling card, in another embodiment of the present invention. Thereafter this apparatus automatically dials the telephone number. The apparatus in this embodiment of the invention comprises a reading means for reading the digitally encoded telephone number. A storage means is provided for storing the area codes of telephone numbers from which a particular telephone number is to be dialed. This storage means may, for example, record a plurality of telephone numbers for a particular area in which the area codes are not used when dialing a telephone number.

A comparator means is operatively connected to the means for storing and to the means for reading in order to determine if the area code of such telephone number is a local area code and not to be dialed. In other words, the comparator means will determine if the area code on the calling card or other card member is the same as an area code which has been stored in the local area code storage member. If it is the same as any one of those stored local area codes, then the area code is not dialed. If the area code on the calling card or other card member is not the same as one of the local stored area codes, then it will automatically be dialed. The processor means is connected to this comparator means to determine if the telephone area code on the calling card or other card member is to be disregarded or to be dialed.

The apparatus of the invention also comprises a means for determining if the telephone number read by the telephone number reading means was accurately read. In other words, the apparatus is self correcting in that it will read the telephone number on two separate occasions to see if the numbers, as read, are identical.

The apparatus of the present invention further provides means for differentiating clock pulse information from the actual telephone number to enable operation of the apparatus on a clock timed basis.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
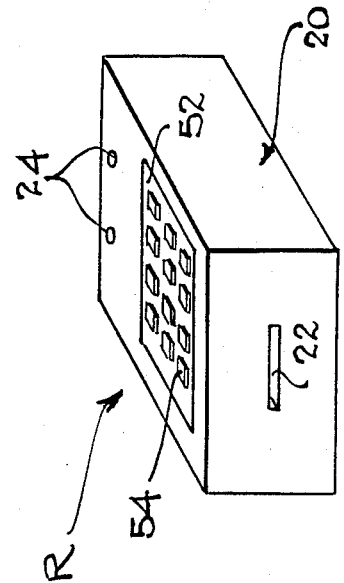
Figure 2:
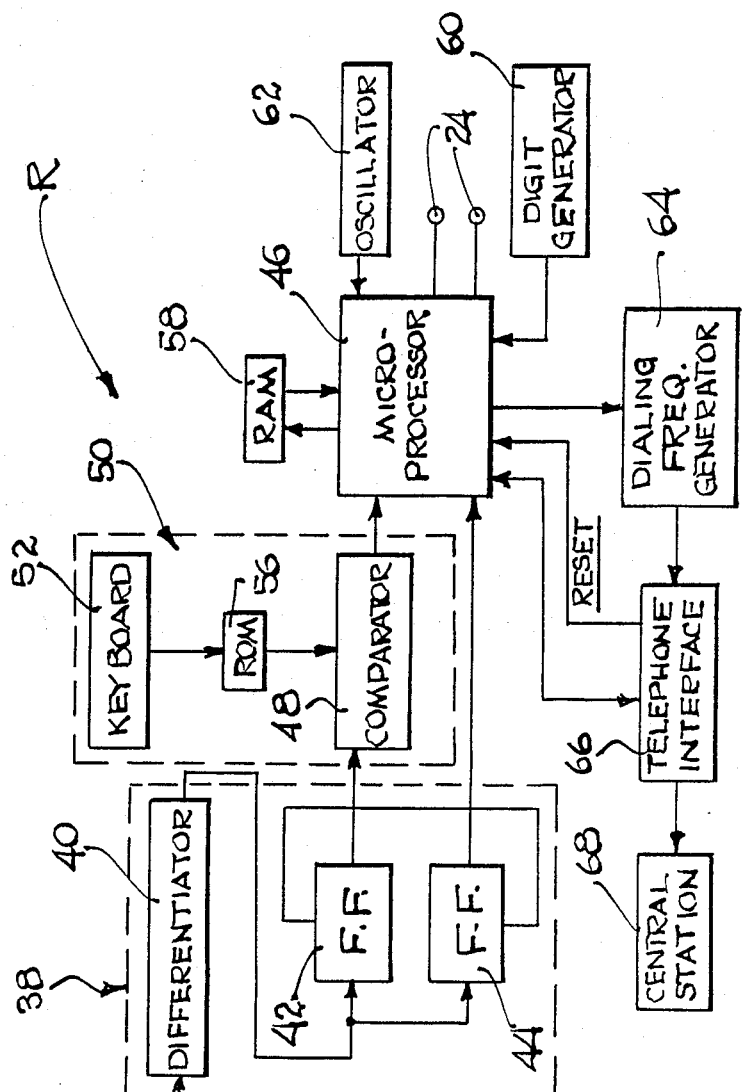
Figure 3:
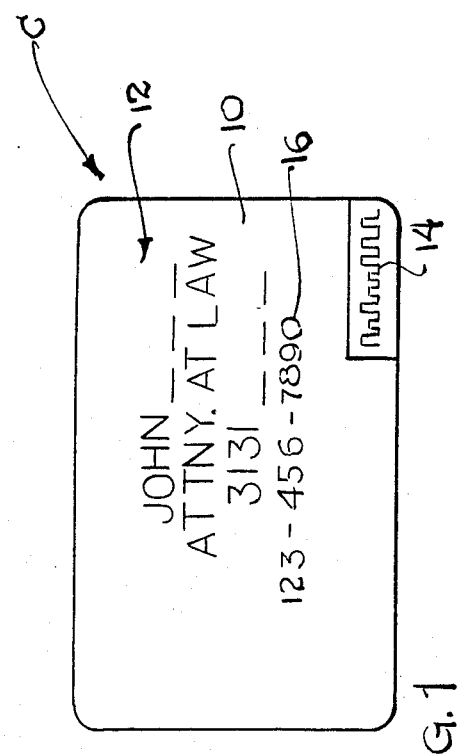
Figure 4:
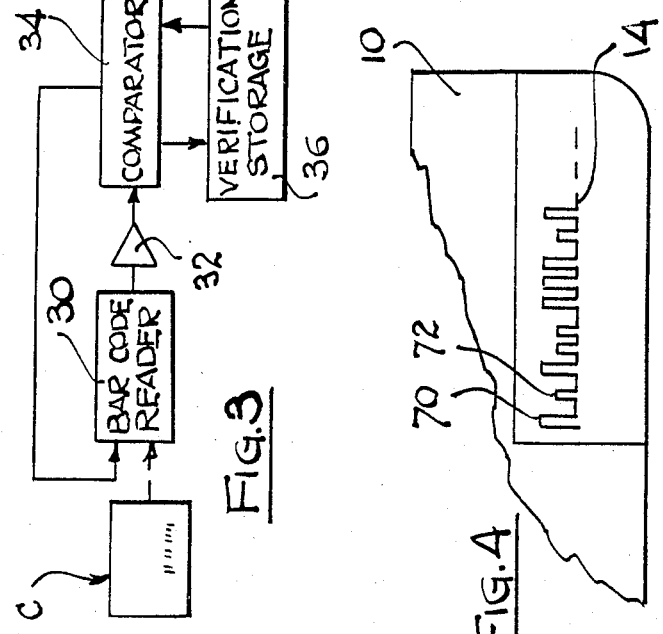

Having thus described the invention in general terms, reference will now be made to the accompanying drawings (two sheets) in which:

FIG. 1 is a schematic front elevational view of a calling card which embosses the principles of the present invention;

FIG. 2 is a perspective view of one form of card reader and dialing apparatus constructed in accordance with and embodying the present invention;

FIG. 3 is a schematic view of one embodiment of a circuit for reading a digitally encoded telephone number on a card member which may be used in accordance with the present invention and which may form part of the apparatus of FIG. 2;

FIG. 4 is an enlarged fragmentary front elevational view showing a portion of the calling card of FIG. 1 with the telephone number digitally encoded thereon;

FIG. 5 is a flow diagram showing the major steps in the operation of reading a card member in accordance with the present invention; and FIG. 6 is a schematic view of a video display circuit portion which may form part of the circuit of the present invention.

DETAILED DESCRIPTION OF A PREFERRED EMBODIMENT

Referring now in more detail and by reference characters to the drawings which illustrate a preferred embodiment of the present invention, C designates a calling card which is constructed in accordance with and embodies the present invention. This calling card C comprises a substrate 10 which includes party identification information 12 printed thereon.

The substrate 10 may be formed of any suitable material which is fairly thin in construction so that it may have the overall thickness of a paper stock calling card or a conventional credit card. For this purpose, the substrate 10 may be formed of a paperboard material of the type normally used in calling cards, or it may be formed of a plastic material of the type normally used in the formation of credit cards. Moreover, the substrate 10 may be formed of a plasticize paperboard material. The overall size of the calling card C is also conventional, in that it should preferable adopt the size of a typical credit card or a conventional calling card. For this purpose, a two inch by three inch card could be utilized.

Digitally encoded on the calling card C is certain identification information, such as the telephone number 14 of the party identified on the calling card. In this case, digitally encoded information 14 could be included in a separate block located at the right hand lower portion of the substrate 10. However, the digitally encoded telephone number 14 could be included anywhere on the calling card. Moreover, the telephone number is digitally encoded in the form of a bar code, as shown. However, any type of encoding scheme, as for example, a grey code or a four-bit code or the like may be employed for digitally encoding the telephone number 14 thereon. In like manner, the telephone number 16 may also be imprinted on the calling card and which contains the same information in visible form that the bar code 14 contains in machine readable form.

FIGS. 2 and 3 illustrate a card reader-dialer apparatus R constructed in accordance with and embodying the present invention. This card reader-dialer apparatus R is capable of both reading the bar code information 14 containing the digitally encoded telephone number on the calling card C and automatically dialing a telephone number therefrom. This card reader-dialer apparatus R comprises an outer housing 20 having a slot 22 therein and which is sized to removably receive the calling card C. Thus, when the card C is inserted in the housing 20, the telephone bar code 14 will be read for purposes of generating a dialing signal and can thereafter be removed.

The housing 20 may also be provided with a pair of light indicating diodes or other lights 24 for purposes of indicating the status of the card reader-dialer apparatus R. For example, one of the lights 24 may be a green light indicating a ready status and the other light may be a red light indicating an off/on status or the like.

FIG. 3 more fully illustrates the circuits forming part of the card reader-dialer apparatus R. In this case, the card reader-dialer apparatus R comprises a bar code reader 30 which is often referred to in the industry as a "card reader". This card reader portion of the apparatus is disclosed in numerous prior art publications. Thus, inasmuch as the card reader 30 is conventional in its construction, it is neither illustrated nor described in any further detail herein.

The output of the card reader 30 which effectively constitutes the bar code reader, in accordance with this embodiment of the invention, is introduced into an amplifier 32 for amplifying the signal output from the reader 30. This amplified signal is thereupon introduced into a comparator circuit 34 which operates in conjunction with a verification storage 36. This verification storage 36 is only a temporary storage and operates in conjunction with the comparator 34 in order to determine whether or not the number which has been read by the bar code reader has been accurately read.

Verification of telephone number reading requires two or more sequential readings of the bar code telephone number 14 which are then stored in the temporary verification storage 36. One is compared against the other in the comparator 34. If there is a comparison, then the telephone number 14 which has been read is deemed to be an accurate reading. If the two do not compare, there is deemed to be no accurate reading of the telephone number and another comparison operation takes place with two additional successive telephone number readings from the bar code reader 30. As an example, the telephone number is first read and stored in the verification storage 36. The same telephone number is again read and compared in the comparator 34 with that number previously stored in the verification storage 36. Upon obtaining a comparison, an output from the comparator is introduced into a discriminator circuit 38 or so-called differentiator circuit.

The discriminator circuit 38 is designed to separate clock pulse information from data information which may be contained in the digitally encoded telephone bar code 1 4. The discriminating circuit 38 generally comprises a differentiator 40 and a pair of flip flops 42 and 44 connected in the manner as shown in FIG. 3. The differentiator circuit 40 will segregate any clock pulse information which may be contained in the bar code 14 from the actual data information. In this respect, it is sometimes desirable to literally encode clock information along with the bar code. Otherwise, clock time generation can be conducted only in the card reader-dialer R as hereinafter described. When clock time synchronization information is included in the bar code 14, the differentiator 40 will segregate this information and cause the two flip flops 42 and 44 to operate in combination with each other. Thus, one flip flop 42 is enabled for actual data information and the other flip flop 44 may be actuated for synchronization information, if desired.

The flip flops 42 and 44 ar preferably of the D-type. The information from the reader 30 includes both the data information containing the actual telephone number as well as the clock-time information, as previously described. The data will normally appear as input at the flip flop 42 and the clock information will appear as an input at the flip flop 44. For this purpose, data could be represented by a data start bit and a data stop bit.

The output of the flip flop 44 is introduced directly into a microprocessor 46 to enable the reading of the data information on a clock-time basis. The data information, which contains the actual telephone number, is introduced into a comparator 48 forming part of an area code determination circuit 50, as illustrated by the broken lines in FIG. 3. In generally all cases, the telephone numbers which are encoded on the calling cards, will include an area code for the particular location of that telephone number, as for example, the area code representing a particular city or geographical area. It may be appreciated that the area code should not be dialed under present telephone switching systems when a telephone number in that same area code is to be dialed. In like manner, for areas containing multiple area codes, none of the area codes should be dialed for that particular area. In those cases, it is necessary to disregard the particular area code and not dial the area code along with the remaining digits representing the telephone number. The area code determination means 50 will determine whether or not the area code contained in the digits represented by the bar code 14 is to be dialed.

For this purpose, the calling card reader-dialer R is provided with keyboard 52 containing a plurality of manually actuable switches 54. In this way, the user of the reader-dialer apparatus R may introduce the area code or area codes of the location in which the telephone to be used for dialing. As an example, when the user of the credit card reader-dialer R first installs the apparatus, the area code or area codes for that particular telephone location which should not be dialed are introduced into the read-only memory 56 forming part of the area code determination means 50. Thereafter, on each occasion, when a card member is read, if the area code of the telephone number on that card member appears in the read-only memory, then the area code is to be disregarded for purposes of dialing the telephone number.

In actual operation, the telephone number, including the area code digits, are introduced from the flip flop 42 directly into the comparator 48. The comparator 48 will make a determination as to whether or not the area code for that particular telephone number compares with any of the area codes previously recorded in the read-only memory 56. If there is a comparison, then a signal will be transmitted to the microprocessor 46 to disregard the area code for purposes of dialing the telephone number. Otherwise, if there is no comparison, then the microprocessor 66 will automatically dial the area code along with the remaining digits representing the telephone number as identified on the card member.

The microprocessor 46 will normally include the typical read-only memories (ROM's) and the random access memories (RAM's) of the type normally included in microprocessors. One such random access memory 58 is more fully illustrated in FIG. 3 of the drawings. This random access memory 58 may be used for containing the instructions used for initiating the dialing of a telephone number.

Connected to the microprocessor 46 is a digit generator 60 which may be used for generating additional digits. In many cases, it is necessary in some areas to dial a "0" or a "1" digit for purposes of dialing a particular telephone number. The digit generator 60 will normally be activated for those particular areas to dial the digit "1" in order to bypass the need for operator interruption. Thus, the digit generator can be activated only for those particular areas where the generation of an additional digit or digits is required. Otherwise, the digit generator is not used for generating any such signal.

The digit generator 60 may be automatically initiated for generating a digit whenever the area code determination means 50 determines that an area code is to be included in the telephone number. The digit generator, if desired, could be provided with a switch to automatically generate either a "0" digit, or a "1" digit.

As indicated previously, the apparatus of the present invention operates on a clock-time basis. Moreover, and as previously stated, that clock information may be contained in the bar code 14 recorded on the card member C. An oscillator 62 is connected to the microprocessor 46 for purposes of generating the necessary timing signals. These timing signals will permit the operation of the card reader-dialer apparatus on a clock-time basis.

The microprocessor 46 also has outputs connected to the light emitting diodes or other light emitting devices 24 on the housing 20, also as illustrated in FIGS. 2 and 3 of the drawings.

An output from the microprocessor 46 is introduced into a dialing frequency generator 64 which operates in conjunction with a telephone interface circuit 66. The dialing frequency generator 64 is designed to initiate the dialing signals upon instructions from the microprocessor. Thus, after a number has been properly verified as being accurate and after a determination of whether or not the area code is to be included and whether or not additional digits are generated, the microprocessor 46 will cause the dialing frequency generator 64 to initiate the dialing of a particular telephone number. This dialing frequency generator may operate in the manner similar to a conventional touch tone generator included in a telephone handset.

The dialing frequency generator 64 is given the data information representing the particular digits to be dialed. The dialing frequency generator will thereupon automatically either generate pulses for a pulse system or tones for a tone system under the instructions of the microprocessor 46. The dialing frequency generator 64 is connected directly to the telephone interface circuit 66 which is designed to interface the reader-dialer apparatus R to a conventional telephone hand set and to the switching circuit of a telephone company central station. Thus, the signals which are generated through the dialing frequency generator 64 are transmitted through the telephone interface circuit 66 directly to the telephone company central station 68. In addition, the telephone interface circuit 66 may receive an input from the microprocessor 46 and may also direct an input to the microprocessor 46. Moreover, a reset signal is initiated from the telephone interface circuit directly to the microprocessor 46. The reset signal is generated in a manner used for generating any reset signal. For example, when the telephone set is disconnected, e.g. the hand set is hung-up, a reset signal is automatically initiated to the microprocessor to thereby inform the microprocessor that a phone call has ended.

The telephone interface circuit is generally of a conventional nature and is designed only to ensure a compatibility of the information from the dialing frequency generator directly to the central switching station of the telephone company. Interface circuits for telephone auxiliary equipment of this type are conventional and any of these telephone interface circuits ma be used in connection with the present invention.

The reader-verifier R may be provided with its own power source for operation, as for example, by cadmium selenide batteries. However, if desired, the reader-verifier apparatus R could be connected to any suitable source of electrical power. Moreover, it may be operated directly from the electrical current on the conventional telephone line. Naturally, a voltage regulating mechanism would be provided if the reader-verifier R is operated from the telephone line current. In addition, a battery back-up source would also be located with the apparatus, if the latter is operated from any other source of line current.

FIG. 4 illustrates in enlarged view, the bar code which has been encoded on the card member C of FIG. 1. In this case, the bar code 14 has pulses of large amplitude 70 and pulses of smaller amplitude 72. In this case, the pulses of large amplitude may represent "1" signals and the smaller amplitude pulses may represent "0" signals. In this way, the various "1" and "0" combinations will form the telephone number which is to be recorded from the card member and dialed. The clock pulse information could be recorded in the bar code information in a following sector. Thus, one sector could contain the data information and the following sector would contain the pulse information. In like manner, and in accordance with another embodiment of the present invention, the smaller amplitude pulses could represent clock pulse information and the larger amplitude pulses could represent data information. The width of the pulses could be used to determine whether the pulses represented a "1" or a "0" pulse.

FIG. 5 more fully represents a flow diagram illustrating the major steps in the operation of the card reader-dialer apparatus A. This flow diagram can also be used to represent the various steps in a program for the microprocessor 46. In this case, and by reference to FIG. 5, it can be observed that a card member, such as the calling card C, is inserted into the card reader portion of the reader-verifier apparatus R. The card number digits are read and stored, as for example, in the verification storage 36. The telephone number as encoded in the bar code 14 is thereafter compared in the comparator 34.

By examining the flow chart, it can be observed that if there is no comparison, the card digits are read on a second occasion. If there is a comparison, the information from the comparison is submitted to the discriminator 38 for differentiating between the clock pulses and the data pulses. The clock pulses are introduced directly to a control timing, as for example, a timing section in the microprocessor 46 which operates in conjunction with the oscillator 62 for generating the timing signals. The data pulses are directly introduced into the area code determination circuit 50 for reading the area code digits. These area code digits are compared against the stored area code, as illustrated in FIG. 5. The stored area code would have been stored in the read-only memory 56 and the comparison conducted in the comparator 48. When there is no comparison, the area code will be kept with the digits and will be dialed in the dialing frequency generator 64. When there has been a comparison, the area code will be disregarded. Moreover, there is a determination in the flow diagram as to whether or not the generated digits are to be added. If there is to be a generation of digits, they will be added to the number of digits to be dialed. Usually, they will precede any of the digits to be dialed, including the area code.

It can also be observed that the digitally encoded information could be included on the calling card in a variety of forms. For example, a magnetic strip could be adhered to the card or the information could be magnetically recorded within the card itself. Other techniques for including the digitally encoded information on the card could also be utilized.

It should also be understood that the reader-dialer apparatus R could also have a storage mechanism in which to store calling cards which may be located in an easy-to-flip-through manner. Moreover, an automatically loading mechanism, if desired, could be provided for automatically inserting the card into the reader-dialer apparatus. Numerous benefits are derived from using the card member along with the reader-dialer apparatus, as aforesaid. Moreover, in addition to the greater ease of calling an individual, there would be a virtual elimination of dialing wrong numbers. The problem of dialing wrong numbers is not only troublesome and expensive to the consumer, but it is also a time consuming problem for the telephone companies, particularly those companies which credit the customer when a wrong number is dialed.

The telephone dialing system of the present invention can also be used with a conventional video display 90 and which is connected to the microprocessor 46 through video display interface circuitry 92, as best illustrated in FIG. 6 of the drawings. In this embodiment of the invention, the calling card C could be encoded with information other than the telephone, as for example, the party's name, address, and other information which relates to that party. For example, if the party happens to be a lawyer, his area of specialty and office hours could be encoded directly onto the calling card. In this way, the calling card becomes more of an information retrieval medium as opposed to a typical calling card which usually becomes disposable paper stock.

In accordance with this embodiment of the invention, when the calling card is introduced into the reader-dialer apparatus R, it will also automatically display on the video display screen 90 any information which happens to be magnetically encoded onto that calling card. Accordingly, the party using the calling card may automatically dial the desired telephone number and simultaneously display on the video monitor that information which is encoded onto the calling card.

The information which is read from any card member, such as a calling card or other form of business card, or the like, could also be introduced into a computer, such as typical desk-top computer for storage. Thereafter, this information could also be retrieved easily from the computer storage for display on the monitor of the computer. In addition, and if desired, the computer could be connected to the reader-dialer in such manner so as to automatically dial a telephone number by initiating a command from the computer. The signal from the computer would be introduced directly into the comparator 34, rather from the reader 30 and the amplifier 32.

Thus, there has been illustrated and described a unique and novel calling card along with a unique and novel telephone number reading and dialing apparatus which will automatically dial a telephone read from a card member. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by Letters Patent is:

1. An apparatus for reading a digitally encoded telephone number on a member which contains no electronic circuitry and automatically dialing that telephone number, said apparatus comprising:
 (a) reading means containing all of the electronic circuitry necessary for reading the digitally encoded telephone number and which telephone number is comprised of digits representing a local telephone number and area code digits,
 (b) means for storing an area code of the telephone from which the telephone number is being dialed,
 (c) comparator means operatively connected to said means for storing and to the means for reading to determine if the area code of such telephone number is a local area code and not to be dialed or not a local area code and is to be dialed, (d) processor means connected to the comparator means for determining if the telephone area code is to be disregarded in the dialing of the telephone number and thereafter initiating a dialing of such telephone number or is to be included in the telephone number to be dialed and thereafter initiating a dialing of the area code and the telephone number, and (e) means for connecting said processor means to a telephone set to enable the sending of a dialing signal for the dialed telephone number to a telephone central station.

2. The reading and dialing apparatus of claim 1 further characterized in that said member comprises data information representing a telephone number and clock pulse information, said apparatus comprises means for differentiating clock pulse information from the data information representing an actual telephone number to enable operation of said apparatus.

3. The reading and dialing apparatus of claim 1 further characterized in that said comparator comprises means for determining if the number read by the reading means was accurately read.

4. The reading and dialing apparatus of claim 1 further characterized in that said member is a calling card which contains a telephone number to be dialed encoded on the calling card.

5. The reading and dialing apparatus of claim 4 further characterized in that the telephone number is digitally encoded on the calling card.

6. The reading and dialing apparatus of claim 1 further characterized in that a manually operable input means is provided to introduce the area code of an area of use for said apparatus in the means for storing.

7. The reading and dialing apparatus of claim 4 further characterized in that a video display monitor is operatively connected to said apparatus for display identification information contained on said member.

8. The reading and dialing apparatus of claim 7 further characterized in that a computer storage is operatively connected to said reading and dialing apparatus for recording information contained on said member.

9. A system for reading a digitally encoded telephone number on a calling card which contains no electronic circuitry and automatically dailing that telephone number, said system comprising:

(a) a calling card of the type routinely dispensed to parties and which contains personal or business information about the person dispensing the calling card, said calling card being comprised of:
  (1) a substrate,
  (2) personal identification information on said substrate and including the name and address of the party whom the calling card identifies,
  (3) digitally encoded sensed information also on said substrate, said digitally encoded information representing the telephone number of the party whom the calling card identifies and which is capable of being read by responsive reading equipment and generating a dialing signal for automatically dialing the telephone number of the party whom the calling card identifies, (b) reading means containing all of the electronic circuitry necessary for reading the digitally encoded telephone number and which telephone number is comprised of digits representing a local telephone number and area code digits, (c) means for storing an area code of the telephone from which the telephone number is being dialed, (d) comparator means operatively connected to said means for storing and to the means for reading to determine if the area code of such telephone number is a local area code and not to be dialed or not a local area code and is to be dialed, (e) means associated with said comparator means for determining if the number read by the reading means was accurately read, (f) processor means connected to the comparator means for determining if the telephone area code is to be disregarded in the dialing of the telephone number and thereafter initiating a dialing of such telephone number or is to be included in the telephone number to be dialed and thereafter initiating a dialing of the area code and the telephone number, and (g) means for connecting said processor means to a telephone set to enable the sending of a dialing signal for the dialed telephone number to a telephone central station.

10. The system of further characterized in that a manually operable input means is provided to introduce the area code of an area of use for said system in the means for storing.

11. The system of claim 10 further characterized in that a computer storage is operatively connected to said processor means for recording information contained on said calling card.

* * * * *